United States Patent
Suresh

(10) Patent No.: US 10,586,003 B1
(45) Date of Patent: Mar. 10, 2020

(54) CIRCUIT DESIGN USING HIGH LEVEL SYNTHESIS AND LINKED HARDWARE DESCRIPTION LANGUAGE LIBRARIES

(71) Applicant: Xilinx, Inc., San Jose, CA (US)

(72) Inventor: Avinash Somalinga Suresh, Hyderabad (IN)

(73) Assignee: XILINX, INC., San Jose, CA (US)

(*) Notice: Subject to any disclaimer, the term of this patent is extended or adjusted under 35 U.S.C. 154(b) by 4 days.

(21) Appl. No.: 16/107,991

(22) Filed: Aug. 21, 2018

(51) Int. Cl.
*G06F 17/50* (2006.01)

(52) U.S. Cl.
CPC ........ *G06F 17/5045* (2013.01); *G06F 17/505* (2013.01); *G06F 2217/02* (2013.01); *G06F 2217/04* (2013.01)

(58) Field of Classification Search
CPC ............... G06F 17/5045; G06F 17/505; G06F 2217/02; G06F 2217/04
USPC ................... 716/102, 103, 105, 104; 703/14
See application file for complete search history.

(56) References Cited

U.S. PATENT DOCUMENTS

| 6,298,472 | B1* | 10/2001 | Phillips | G06F 17/5045 716/105 |
| 2006/0288337 | A1* | 12/2006 | Nishi | G06F 9/5038 717/136 |
| 2016/0299998 | A1* | 10/2016 | Isshiki | G06F 17/505 |
| 2019/0205487 | A1* | 7/2019 | Tamiya | G06F 17/50 |

OTHER PUBLICATIONS

Chevobbe et al., "Reducing Reconfigurable Overheads in Heterogeneous Multicore RSoCs with Predictive Configuration Management", Hindawi Publishing Corporation, International Journal of Reconfigurable Computing, vol. 2009, 2009, Article ID 290167, 7 pages. (Year: 2009).*
Picard et al., "Multilevel Simulation of Heterogeneous Reconfigurable Platforms", Hindawi Publishing Corporation, International Journal of Reconfigurable Computing, vol. 2009, 2009, Article ID 162416, 12 pages. (Year: 2009).*
Pohl et al., "vMAGIC—Automatic Code Generation for VHDL", Hindawi Publishing Corporation, International Journal of Reconfigurable Computing, vol. 2009, 2009, Article ID 205149, 9 pages. (Year: 2009).*
Quadri et al. "High level modeling of Dynamic Reconfigurable FPGAs", Hindawi Publishing Corporation, International Journal of Reconfigurable Computing, vol. 2009, 2009, Article ID 408605, 15 pages. (Year: 2009).*

* cited by examiner

*Primary Examiner* — Phallaka Kik
(74) *Attorney, Agent, or Firm* — Kevin T. Cuenot

(57) ABSTRACT

Using high level synthesis (HLS) and linked hardware description language (HDL) libraries to implement a circuit design includes generating, using computer hardware, a data flow graph from a model that includes an HDL model block coupled to a non-HDL model block, wherein the HDL model block is derived from HDL code, and dividing, using the computer hardware, the data flow graph into a first sub-graph corresponding to the HDL model block and a second sub-graph corresponding to the non-HDL model block. Using the computer hardware, a first HDL core is generated from the first sub-graph, synthesizable program code is generated form the second sub-graph, HLS is performed on the synthesizable program code to generate a second HDL core, and the circuit design is generated including the first HDL core connected to the second HDL core.

20 Claims, 5 Drawing Sheets

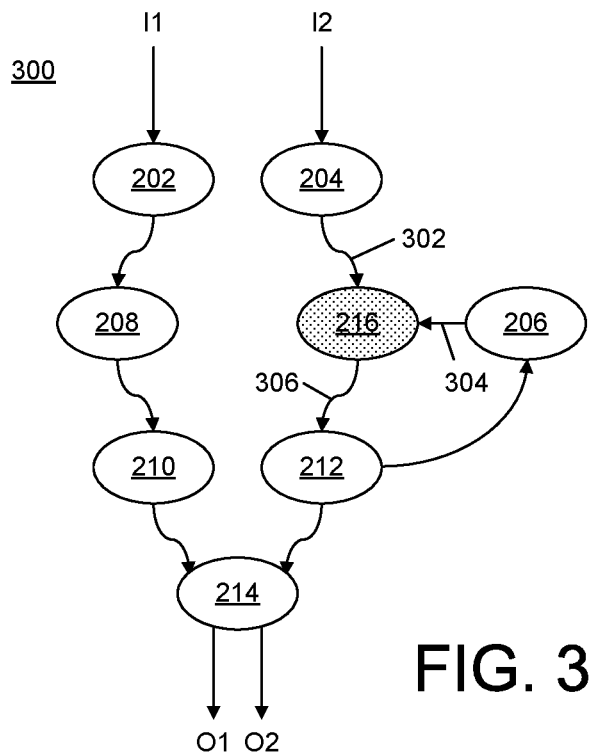
FIG. 3
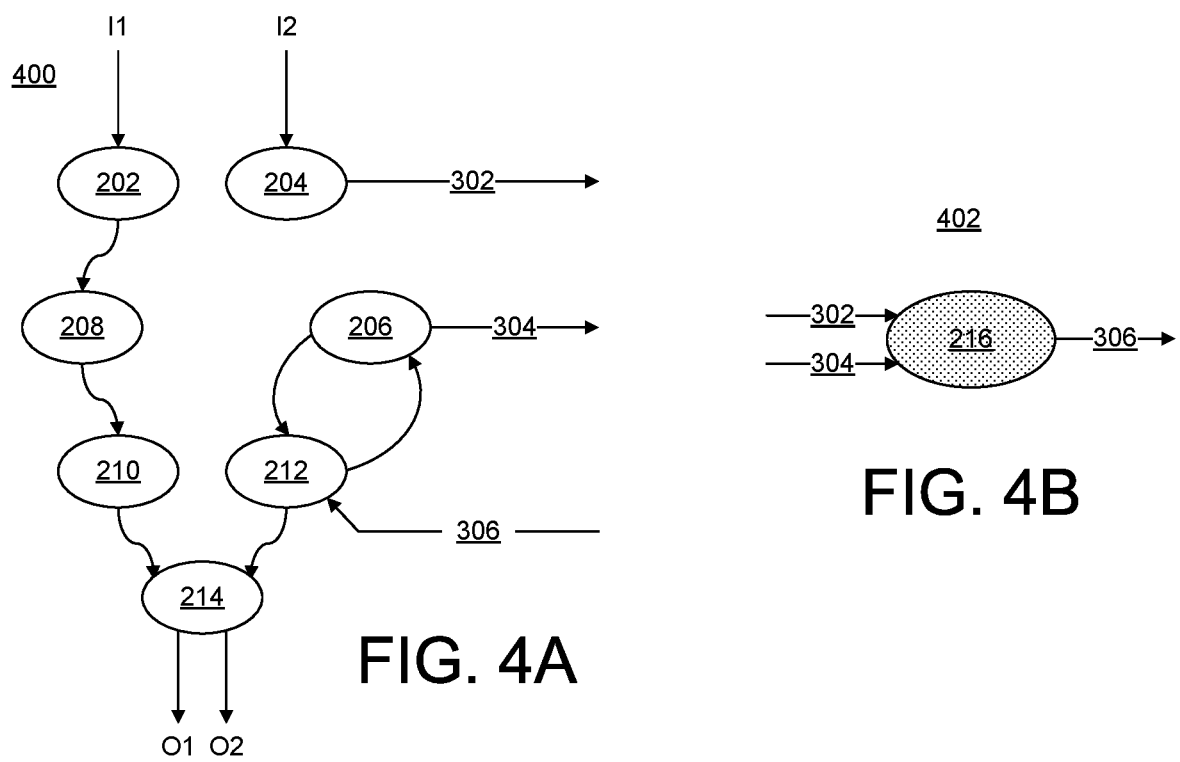
FIG. 4A
FIG. 4B

CIRCUIT DESIGN USING HIGH LEVEL SYNTHESIS AND LINKED HARDWARE DESCRIPTION LANGUAGE LIBRARIES

TECHNICAL FIELD

This disclosure relates to integrated circuits (ICs) and, more particularly, to creating and implementing circuit designs for ICs using high level synthesis (HLS) and linked hardware description language (HDL) libraries.

BACKGROUND

High-level synthesis or "HLS" is an automated design process in which a description of desired behavior of a system is converted into a circuit design and/or digital circuitry. The description of the desired behavior is typically written as an application in a high-level programming language such as C or C++. The application is translated into a circuit design specified as a register transfer level (RTL) description. The RTL description describes a synchronous digital circuit in terms of the flow of digital signals between hardware registers and the operations performed on those signals. The circuit design may be processed (e.g., synthesized, placed, and routed) through a design flow. Further, the processed circuit design may be implemented within an IC.

SUMMARY

In one or more embodiments, a method includes generating, using computer hardware, a data flow graph from a model that includes a hardware description language (HDL) model block coupled to a non-HDL model block, wherein the HDL model block is derived from HDL code, dividing, using the computer hardware, the data flow graph into a first sub-graph corresponding to the HDL model block and a second sub-graph corresponding to the non-HDL model block, generating, using the computer hardware, a first HDL core from the first sub-graph, generating, using the computer hardware, synthesizable program code from the second sub-graph, performing, using the computer hardware, high-level synthesis on the synthesizable program code to generate a second HDL core, and generating, using the computer hardware, a circuit design including the first HDL core connected to the second HDL core.

In one or more embodiments, a system includes a memory configured to store program code and a processor coupled to the memory. The processor, in response to executing the program code, is configured to initiate operations. The operations include generating a data flow graph from a model that includes an HDL model block coupled to a non-HDL model block, wherein the HDL model block is derived from HDL code, dividing the data flow graph into a first sub-graph corresponding to the HDL model block and a second sub-graph corresponding to the non-HDL model block, generating a first HDL core from the first sub-graph, generating synthesizable program code from the second sub-graph, performing high-level synthesis on the synthesizable program code to generate a second HDL core, and generating a circuit design including the first HDL core connected to the second HDL core.

In one or more embodiments, a computer program product includes a computer readable storage medium having program code stored thereon. The program code is executable by a processor to perform operations. The operations include generating a data flow graph from a model that includes an HDL model block coupled to a non-HDL model block, wherein the HDL model block is derived from HDL code, dividing the data flow graph into a first sub-graph corresponding to the HDL model block and a second sub-graph corresponding to the non-HDL model block, generating a first HDL core from the first sub-graph, generating synthesizable program code from the second sub-graph, performing high-level synthesis on the synthesizable program code to generate a second HDL core, and generating a circuit design including the first HDL core connected to the second HDL core.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example of a data flow graph of the model illustrated in FIG. 2.

FIGS. 4A and 4B illustrate example sub-graphs generated from the data flow graph of FIG. 3.

DETAILED DESCRIPTION

Figure 1:
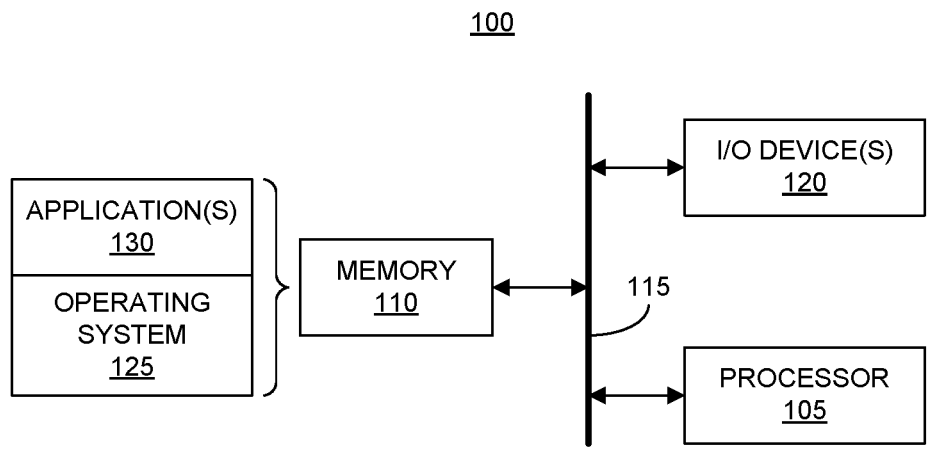
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to creating and implementing circuit designs for ICs using high-level synthesis (HLS) and linked hardware description language (HDL) libraries. Within conventional HLS systems, users are unable to interface HDL libraries with HLS blocks. The HLS blocks generally correspond to, or are converted to, high-level programming language (HLPL) code. An HDL library, however, cannot be invoked from an HLPL program. As a result, users are unable to create and/or simulate HLS designs, or models, that incorporate HLS blocks and HDL libraries.

Instead, HLPL code that is generated from the user's HLS design is first converted to HDL. The user may then manually connect the HDL code generated from the HLPL code with the desired HDL libraries. Some tools help users connect HDL libraries to the translated HDL code by insertion of control logic such as a processor or a state machine. These techniques, while guided by the tool, are manual procedures that require a significant amount of user time and effort to connect the generated HDL code to the HDL libraries and the inserted control logic. The control logic uses circuit resources on the target IC that would otherwise be available to the user's design. Further, the control logic increases the size and power consumption of the user's design.

In accordance with the inventive arrangements described within this disclosure, a system is provided that is capable of implementing a model-based design flow for creating and/or implementing circuit designs. The model-based design flow provides a modeling environment in which high-level model blocks, e.g., HLS blocks, are provided. Each model block, for example, represents a different function. A user is capable of building a model of an electronic system (e.g., a circuit) by arranging and connecting selected ones of the model blocks within the modeling environment.

The system is capable of importing an HDL library into the modeling environment. Once imported, portions of HDL code from the HDL library are available as HDL model blocks within the modeling environment. A user is capable of inserting one or more of the HDL model blocks corresponding to the imported HDL code into the model. The HDL model blocks can be connected with other non-HDL model blocks within the modeling environment. The system is capable of generating a circuit design specified in HDL from a model, e.g., an HLS design, that includes both HDL model blocks and non-HDL model blocks within the model.

In particular embodiments, the system generates the circuit design from the model automatically. In doing so, the system effectively interfaces HLPL code generated from the non-HDL model blocks with HDL code from the HDL model blocks. The resulting circuit design can be further processed and implemented within an IC. The system is capable of generating a synthesizable result, e.g., a circuit design. In particular embodiments, the system does not add additional control logic or other resources to interface the portions of the circuit design derived from the HDL model block portions with portions of the circuit design derived from non-HDL model blocks. Because the circuit design is fully specified and modeled in the modeling environment and additional control logic is not required, the Quality of Result (QOR) of the resulting circuit design exceeds that obtained using other conventional techniques. For example, the resulting circuit design is smaller (requires less IC area) and more power efficient than would otherwise be the case.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100 for use with one or more embodiments described herein. System 100 is an example of computer hardware that is used to implement a computer, a server, a portable computer such as a laptop or a tablet computer, or other data processing system. A system or device implemented using computer hardware is capable of performing the various operations described herein relating to processing a model and/or a circuit design for implementation within an IC.

In the example of FIG. 1, system 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 is capable of executing the program code accessed from memory 110 via interface circuitry 115.

Memory 110 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code to reduce the number of times program code must be retrieved from a bulk storage device during execution.

Memory 110 is capable of storing program code and/or data. For purposes of illustration, memory 110 stores an operating system 125 and one or more application(s) 130. In one or more embodiments, application(s) 130 include a modeling environment. An example of a modeling environment is MATLAB used in combination with SIMULINK available from The Mathworks, Inc. of Natick, Mass. Such a modeling environment is capable of executing further applications as part of the modeling environment. For example, the modeling environment may execute an application such as Model Composer available from Xilinx, Inc. of San Jose, Calif. Model Composer is a model-based design tool that facilitates design and exploration of electronic systems and/or circuit designs within ICs, including programmable ICs. Taken collectively, system 100, executing applications 130 as described, implements an HLS system in which models of designs, or HLS designs, are created and simulated.

In another aspect, applications 130 also include an electronic design automation (EDA) application. The EDA application is capable of performing one or more operations of a design flow (e.g., synthesis, placement, routing, and/or bitstream generation) on a circuit design developed using HLS to implement the circuit design within a target IC. In particular embodiments, the target IC has an architecture the same as or similar to the architecture described in connection with FIG. 8.

System 100, e.g., processor 105, is capable of executing operating system 125 and application(s) 130 to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

Examples of interface circuitry 115 include, but are not limited to, a system bus and an input/output (I/O) bus. Interface circuitry 115 may be implemented using any of a variety of bus architectures. Examples of bus architectures include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 100 further may include one or more I/O devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

Figure 2:
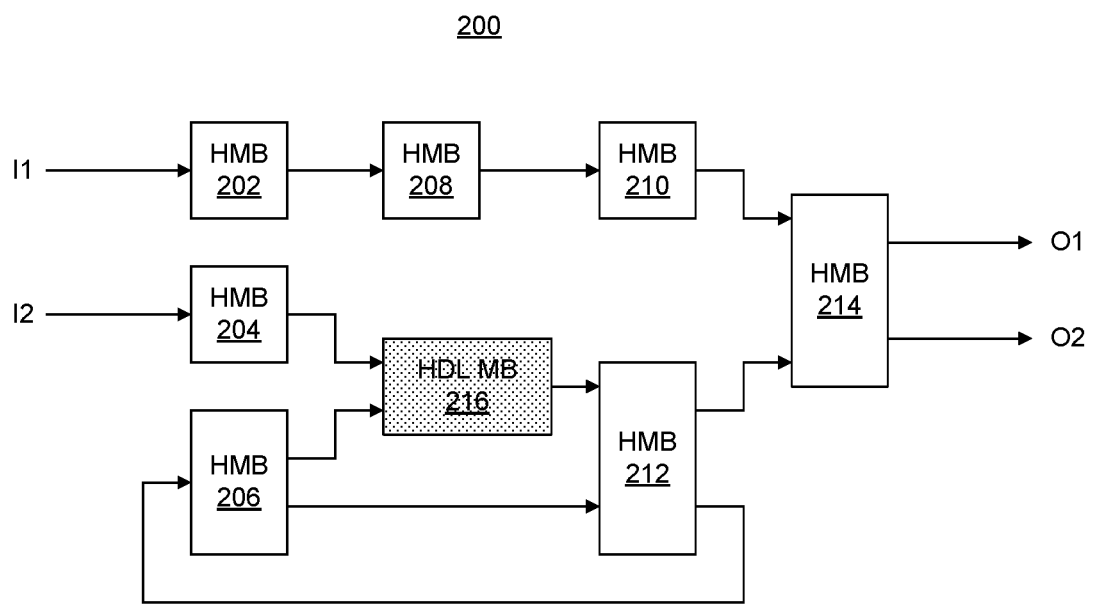
FIG. 2 illustrates an example model including model blocks.

FIG. 2 illustrates an example model 200 including model blocks. Model 200 is created within a modeling environment provided using a system as described in connection with FIG. 1 (hereafter "the system"). In one or more embodiments, model 200 is an HLS design formed of one or more HLS model blocks and one or more model blocks derived from an HDL library. In the example of FIG. 2, model 200 includes a variety of different interconnected model blocks. For example, model 200 includes HLS model blocks that are considered "native" to the modeling environment. HLS model blocks (abbreviated as "HMB" in FIG. 2) include HMBs 202, 204, 206, 208, 210, 212, and 214. HLS model blocks are also referred to herein as non-HDL model blocks. Model 200 further includes HDL model block (abbreviated as "HDL MB" in FIG. 2) 216. HLS model block 202 receives an input I1. HLS model block 204 receives an input I2. HLS model block 214 generates two outputs O1 and O2. For purposes of illustration, HDL model blocks are represented with shading.

Each of HLS model blocks 202-214 are standard model blocks available within the modeling environment. Each of HLS model blocks 202-214, for example, is capable of performing a particular function. As generally known, HLS model blocks within a modeling environment provide highly abstracted functions that are capable of providing rich data types and multi-dimension support. For example, each HLS model block includes or is associated with a simulation executable. When simulating a model, the system executes the simulation executables corresponding to each respective HLS model block. The system routes inputs and outputs among the simulation executables corresponding to the HLS model blocks based on the connections made between the HLS blocks of the model.

HDL model block 216 is a model block generated from a portion of HDL code, e.g., an HDL core, imported into the modeling environment. For example, a system such as system 100 described in connection with FIG. 1 is capable of importing one or more portions of HDL code from an HDL library and generating a model block, referred to an HDL model block, corresponding to each respective portion of HDL code (e.g., core) from the HDL library. Once imported within the modeling environment, an HDL model block can be inserted into a model, connected to other HLS model blocks and/or other HDL model blocks as part of a model, and simulated as part of the model within the modeling environment.

In general, model 200 facilitates simulation of the design through execution of the simulation executables of native model blocks 202-214. In one or more embodiments, the HDL code from which HDL model block 216 is derived also has a simulation executable that can be used for purposes of modeling. In particular embodiments, the HDL code is packaged using an industry standard format. An example of an industry standard format for packaging HDL and/or cores is IP-XACT. IP-XACT is an eXtensible Markup Language (XML) format that defines and describes individual, re-usable electronic circuit designs to facilitate use of the designs in creating ICs. If the HDL code has a simulation model, the simulation model is specified or captured in the IP-XACT as metadata. If no simulation executable is available for the HDL code, the modeling environment may use a standard HDL simulator in the background to simulate the HDL code corresponding to the HDL model blocks that are generated for use in the model.

The modeling environment is capable of simulating model 200 by executing the respective simulation executables of HLS model blocks 202-214 and HDL model block 216. In the example of FIG. 2, the result (output) generated by the simulation executable of HLS model block 204 and the result (output) generated by the simulation executable of HLS block 206 are provided as inputs to the simulation executable of HDL model block 216. The result (output) generated by the simulation executable of HDL model block 216 (or HDL simulator as the case may be) is provided to the simulation executable of HLS model block 212 as an input. Thus, HDL code (e.g., one or more HDL cores) can be imported into a modeling environment and utilized in combination with one or more HLS model blocks for purposes of simulation. Further details relating to the importation of HDL cores and/or an HDL library are provided in connection with FIG. 6.

Figure 5:
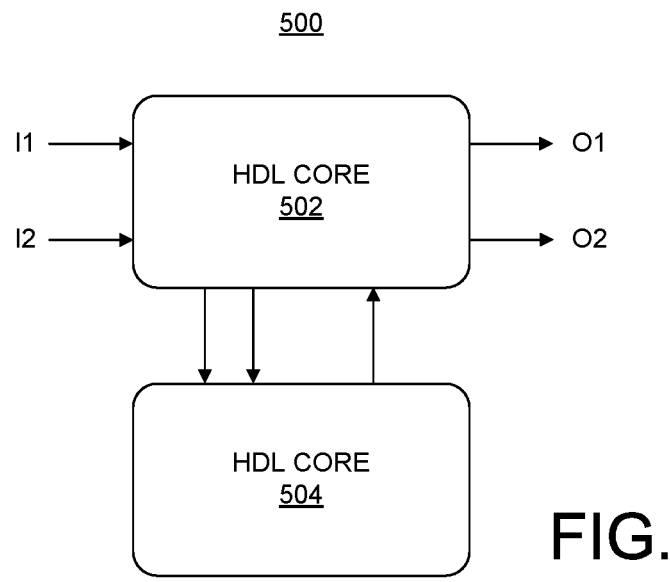
FIG. 5 illustrates an example of a circuit design generated from the example sub-graphs of FIGS. 4A and 4B.

FIGS. 3-5 illustrate example operations performed by the system to generate a circuit design specified in HDL. FIG. 3 illustrates an example of a data flow graph 300 of the model illustrated in FIG. 2. In the example of FIG. 3, the system has transformed model 200 into data flow graph 300. In the example of FIG. 3, each block of model 200 is represented as a node. The port connections between the model blocks of model 200 are represented as edges in data flow graph 300. For purposes of illustration, like reference numbers are used where HLS model block 202, for example, corresponds to HLS node 202. Within data flow graph 300, edge 302 connects node 204 to node 216. Edge 304 connects node 206 to node 216. Edge 306 connects node 216 to node 212. The nodes are represented with a different shape to illustrate the transformation from model 200 to data flow graph 300.

FIGS. 4A and 4B illustrate example sub-graphs 400 and 402 generated from example data flow graph 300 of FIG. 3. Referring to FIGS. 4A and 4B, the system is capable of separating data flow graph 300 into two sub-graphs. Referring to FIG. 4A, the system generates sub-graph 402 to include only nodes corresponding to HLS model blocks of data flow graph 300. The connections between respective nodes within sub-graph 400 are maintained from data flow graph 300 with the exception of those edges (e.g., edges 302, 304, and 306) that connected to nodes representing HDL model blocks (e.g., node 216). As illustrated in FIG. 4A, edges 302 and 304 are now external edges of sub-graph 400 corresponding to outputs from sub-graph 400. Edge 306 provided to node 212 is now an external edge of sub-graph 400 corresponding to an input to sub-graph 400 received from node 216.

Referring to FIG. 4B, the system generates sub-graph 402 to include only nodes corresponding to HDL model blocks from data flow graph 300. Referring to FIG. 4B, sub-graph 402 includes only node 216. As shown, inputs to node 216, e.g., now external edges 302 and 304, are shown as inputs to sub-graph 402 taken from outputs of sub-graph 400. Further, the output from node 216, e.g., now external edge 306, is an output from data flow-sub-graph 402 that is provided to sub-graph 400 as an input.

FIGS. 4A and 4B illustrate how the system is capable of effectively separating the different portions of a data flow graph based upon the origin of the respective model blocks. For purposes of description, nodes of a data flow graph or sub-graph corresponding to HDL model blocks are also referred to as HDL nodes. Nodes of a data flow graph or sub-graph corresponding to non-HDL model blocks (e.g., HLS model blocks) are referred to as non-HDL nodes.

FIG. 5 illustrates an example of a circuit design 500 generated from the sub-graphs of FIGS. 4A and 4B. The system is capable of generating circuit design 500 from the sub-graphs of FIGS. 4A and 4B. In the example of FIG. 5, circuit design 500 is specified in HDL. In generating circuit design 500, the system first generates HDL core 502 from sub-graph 400 and HDL core 504 from sub-graph 402. The system is capable of connecting HDL core 502 and HDL core 504 automatically. The system determines connectivity between HDL core 502 and HDL core 504 based on the connectivity between sub-graphs 400 and 402 as shown in FIGS. 4A and 4B.

FIGS. 3-5 are provided for purposes of illustration and, as such, are not intended to be limiting. Further details relating to the generation of a circuit design from a model that incorporates both non-HDL model blocks and HDL model blocks is described in greater detail in connection with FIGS. 6 and 7.

Figure 6:
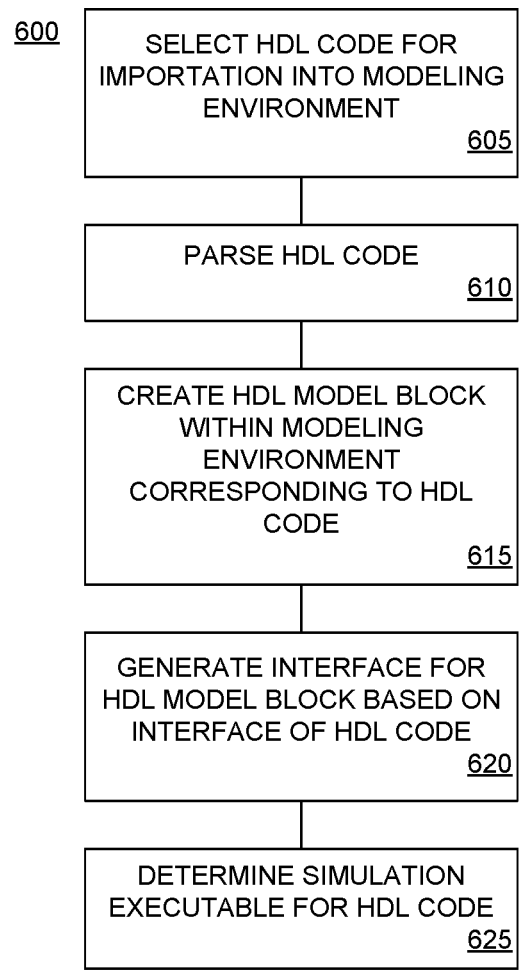
FIG. 6 illustrates an example method of generating a hardware description language (HDL) model block.

FIG. 6 illustrates an example method 600 of generating an HDL model block. Method 600 is performed by a system as described in connection with FIG. 1 to import HDL code within a modeling environment. Method 600 may be performed and repeated as required to import multiple elements of an HDL library into the modeling environment.

In block 605, the system selects a portion of HDL code for importation into the modeling environment. For example, the system receives a user request to import a portion of HDL code. The user request can specify the HDL code to be imported into the modeling environment. In one or more embodiments, the HDL code is an HDL core. The system, in turn, is capable of selecting the HDL code. The HDL code can be part of an HDL library that specifies a particular circuit block. In one or more embodiments, the HDL code is specified using an industry standard format that provides block configuration parameters, port interfaces, simulation models (if any as metadata). An example of an industry standard format is IP-XACT.

In block 610, the system is capable of parsing the HDL code. For example, the system parses the XML file for the HDL code (e.g., an IP-XACT XML file) and determines the required information for creating a model block based on the information specified by the XML file and/or other HDL files listed in the XML file. In parsing the HDL code, the system is capable of identifying different portions of the HDL code such as the block configuration parameters, the port interfaces, and the simulation models. As such, the system is capable of determining the various signals provided to the HDL code as inputs and the signals output from the HDL code.

In block 615, the system creates a model block within the modeling environment corresponding to the HDL code. More particularly, the system creates the model block corresponding to the HDL code based on the information determined from the XML file. The model block, being created to represent HDL code, is referred to as an HDL model block and includes a parameter designating the model block as an HDL model block. While IP-XACT used as an example of an industry standard, it should be appreciated that other industry standards for packaging cores or Intellectual Properties (IPs) for circuit designs may be used. In this regard, the embodiments described herein are not intended to be limited to the particular format used to provide the HDL code.

In block 620 the system generates an interface for the HDL model block based on the interface of the HDL code. For example, the interface for the HDL model block includes inputs and outputs corresponding to the input signals and output signals (e.g., port interfaces) of the HDL code.

In block 625, the system determines a simulation executable for the HDL code. In one or more embodiments, the HDL code is associated with a corresponding simulation executable. In particular embodiments, the system determines the simulation executable automatically, e.g., by searching in a particular directory, or the user indicates the location of the simulation executable for the HDL code that is imported. Accordingly, the system is capable of storing a reference to the simulation executable thereby allowing the system to execute the simulation executable when simulating any model in which the generated HDL model block is included.

In other embodiments, if no simulation executable is available, the system utilizes an HDL simulator to simulate the HDL code. In that case, the system stores information indicating that HDL simulation is to be used for the HDL model block.

In one or more embodiments, when including an HDL model block within a model within the modeling environment, the user is capable of specifying one or more parameters for the HDL model block. The parameters are specified in the XML file, for example. The parameters may be for the interface of the model block. As an illustrative and non-limiting example, user specifiable parameters for the HDL code (or HDL core) may be carried forward through the importation process as user specifiable parameters for the HDL model block. In response to a user request, the system can display a user interface through which the user can specify the parameters for the HDL model block when used in a model in the modeling environment. These user-provided parameters are used by the system to guide implementation of the circuit design relating to both HDL model blocks and the non-HDL model blocks.

For example, an HDL core may have a configurable interface. The interface, based upon user specified parameters, may be implemented as a streaming interface or a memory mapped interface. An example of a streaming interface is a stream-enabled on-chip interconnect such as an Advanced Microcontroller Bus Architecture (AMBA®) Advanced Extensible Interface (AXI) stream interconnect. An AXI-stream interconnect enables connection of heterogeneous master/slave AMBA® AXI-stream protocol compliant circuit blocks. An example of a memory mapped interface is a memory-mapped on-chip interconnect such as an AXI memory mapped interface.

In this example, the HDL core can be implemented with either a memory mapped interface or a streaming interface depending upon the user specified parameters for the core. In implementing the HDL model block, the system detects the user specifiable parameters for the HDL code and creates corresponding user specifiable parameters for the resulting HDL model block. The user may invoke a user interface (e.g., a graphical user interface (GUI)) to specify any parameters of the HDL model block. The user, for example, may specify that a streaming interface or a memory mapped interface for the HDL model block is to be used. The selection of a particular parameter for the model block may be used to select or modify the particular simulation executable used for the HDL model block to better simulate the type of interface chosen by the user. In any case, the system stores these user-specified parameters with the HDL model block and uses the parameters when implementing the model.

Figure 7:
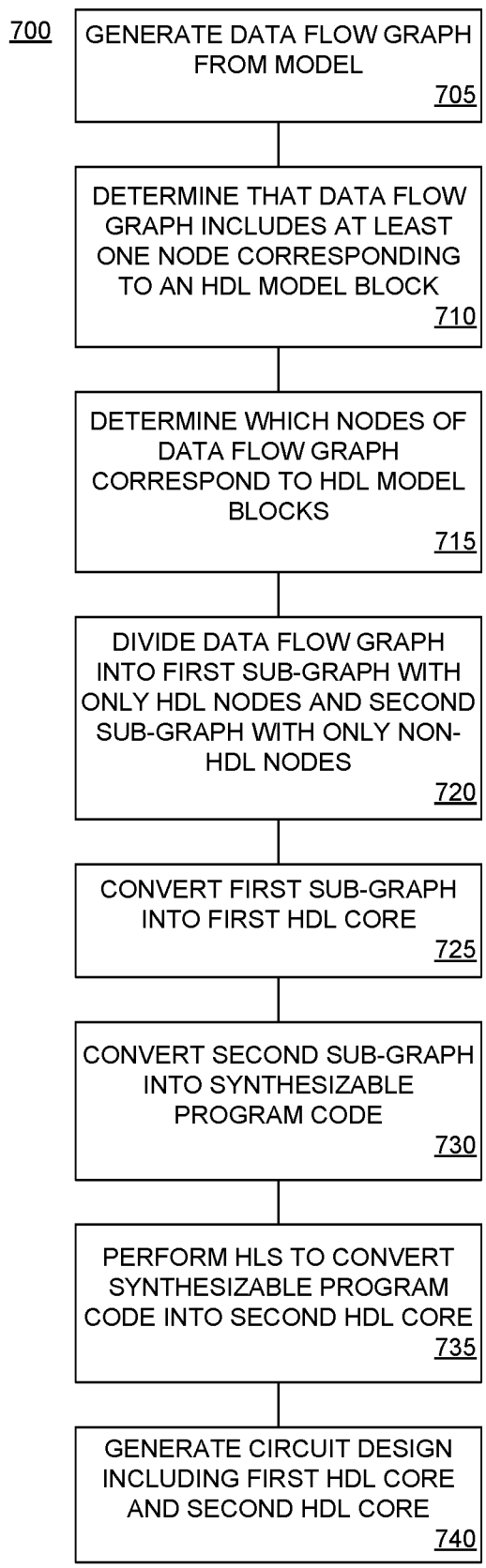
FIG. 7 illustrates an example method of implementing a circuit design using high-level synthesis and a linked HDL library.

FIG. 7 illustrates an example method 700 of implementing a circuit design using HLS and a linked HDL library. Method 700 is performed by a system as described in connection with FIG. 1. Method 700 begins in a state where a user has imported one or more portions of HDL code into the modeling environment and created a model that includes one or more non-HDL model blocks and one or more HDL model blocks. For example, the user may use the system to create a model such as model 200 described in connection with FIG. 2.

In block 705, the system generates a data flow graph from the model. For purposes of illustration, the system converts a model as described in connection with FIG. 2 to a data flow graph as described in connection with FIG. 3. As a data flow graph, model blocks, whether HDL or non-HDL, are represented as nodes while port connections between the model blocks are represented as directed edges connecting the nodes. In generating the data flow graph, any parameters of the model blocks are carried forward to the corresponding nodes of the data flow graph. For example, the status of each model block being either non-HDL or HDL is carried forward to each corresponding node. Similarly, any user-specified parameters and/or port connections are carried forward to the corresponding edges in the data flow graph.

In block 710, the system determines that the data flow graph includes at least one HDL node (e.g., and therefore that the model included at least one HDL model block). For example, the system is capable examining the nodes of the data flow graph to determine whether any node has an attribute indicating that the node is an HDL node. In block 715, the system determines which nodes of the data flow graph are HDL nodes. For example, the system generates a list of the HDL nodes of the data flow graph.

In block 720, the system divides the data flow graph into two different sub-graphs. The system generates a first sub-graph that includes only HDL nodes. The system generates a second sub-graph that includes only non-HDL nodes. In generating the two sub-graphs, the system creates external edges for those edges that connected non-HDL nodes of the data flow graph with HDL nodes of the data flow graph as described in connection with FIGS. 4A and 4B.

In block 725, the system converts the first sub-graph that includes only HDL nodes into an HDL core. In cases where the first sub-graph includes a single HDL node, the original HDL code from which the HDL model block was derived is used as HDL core 504. The system uses any user provided parameters for the HDL model block to parameterize HDL core 504.

In cases where the first sub-graph includes more than one HDL node (e.g., derived from multiple HDL cores), the system generates HDL core 504 using each of the original portions of HDL code from which the HDL model blocks were derived. Further, in creating HDL core 504, the system connects the portions of HDL code within HDL core 504 based on the connectivity of the first sub-graph. The system uses any user provided parameters for the HDL model block(s) to parameterize HDL core 504.

In block 730, the system converts the second sub-graph into synthesizable HLPL program code. In one or more embodiments, in converting the second sub-graph into HLPL program code, the system first converts the second sub-graph into an abstract syntax tree (AST). An AST is a tree representation of the abstract syntactic structure of source code written in a programming language where each node in the tree corresponds to a construct within the source code. The system generates the HLPL code from the AST.

In one or more embodiments, in generating the HLPL program code, the system also generates one or more hardware directives that specify implementation options for the HLPL program code. The system includes the hardware directives within the HLPL program code, e.g., as hardware compiler directives. Referring to the example where the user provides a parameter specifying the type of interface for HDL model block 216 to be either a memory mapped interface or a streaming interface, the system determines the user-specified parameter for corresponding HDL node 216. For any of the non-HDL nodes having edges that connect to HDL node 216 (or other HDL nodes), the system determines the user specified parameters for HDL node 216 and includes hardware directives for the non-HDL nodes that connect to HDL node 216. The hardware directives specify implementation options for the non-HDL nodes that match the user specified parameters for HDL node 216.

For purposes of illustration, if a parameter of HDL node 216 indicates that the interface is a memory mapped interface, the system inserts hardware directives specifying that non-HDL nodes 204, 206, and 212 connect to HDL node 216 via memory mapped interfaces. If a parameter of HDL node 216 indicates that the interface is a streaming interface, the system inserts hardware directives specifying that non-HDL nodes 204, 206, and 212 connect to HDL node 216 via streaming interfaces. In general, the system evaluates the HDL nodes of the first sub-graph that couple to nodes within the second sub-graph to determine the interface types and uses the determined interface types (e.g., matching interface types) to implement the non-HDL nodes of the second sub-graph in hardware. This allows the HDL to drive the hardware implementation of the HLPL and allows the interfaces of non-HDL nodes to match the interfaces of connected HDL nodes.

In block 735, the system converts the HLPL code into a second HDL core. In block 740, the system generates a circuit design that includes the first HDL core and the second HDL core. The system, in generating the circuit design, connects the first HDL core and the second HDL core. For example, the system connects the input and output ports of the first and second HDL cores based on the connectivity between the first and second sub-graphs. The system connects the first HDL core to the second HDL core by connecting port interfaces of the respective HDL cores that correspond to the external edges (e.g., edges 302, 304, and 306) from the first and second sub-graphs. For purposes of explanation, the inputs (I1, I2) and outputs (O1, O2) are not considered external edges.

In accordance with the inventive arrangements described within this disclosure, a system is provided that allows HDL libraries to be directly linked with HLS based tools by abstracting the HDL libraries as model blocks that can be used within a modeling environment. Within the modeling environment, the system is capable of simulating a model that includes one or more HDL model blocks interconnected with one or more non-HDL model blocks. The system is capable of generating a synthesizable result, e.g., a circuit design, without adding any additional control logic or other resources for interfacing the HDL libraries with the HLS derived portions of the circuit design.

In one or more embodiments, incremental synthesis may be performed using the techniques described within this disclosure. For example, for a given model transformed into a data flow graph, the data flow graph may be subdivided into two or more different sub-graphs. The system is capable of processing a first of the sub-graphs independently to generate synthesizable HLPL and compile the HLPL into an HDL core. The resulting HDL core may be imported into a circuit design. The system is capable of repeating this process for each of the respective sub-graphs. This process allows each of the different portions of the model (e.g., sub-graphs) to be brought into a circuit design as a separate HDL core that can be edited and/or modified independently of the other HDL cores of the circuit design. This allows the system to achieve increased Quality of Result (QOR) on the resulting circuit design by allowing incremental synthesis on the different HDL cores as opposed to attempting to edit or modify the entire model as a single, larger HDL core.

Using the techniques described herein, a system is able to import HDL design constructs such as multiple clocks, clock domain crossings, and other targeted hardware macros into the modeling environment as HDL model blocks thereby facilitating the creation of more complex and realistic models in the modeling environment with the ability to directly link the HDL libraries with the HLS model blocks of the model. In addition, the simulation speed within the modeling environment is improved (e.g., runs faster). Usability of the modeling environment is also improved.

Because the resulting circuit design does not include control logic to couple and coordinate operation of the HLS model block derived portions of the circuit design with the HDL model block derived portions of the circuit design, the EDA tool that performs operations such as synthesis, placement, routing, and/or configuration bitstream generation is able to perform the operations described in less time due, at least in part, to the reduced size and/or complexity of the circuit design. In addition, the inventive arrangements described herein support more than one clock within the design in the modeling environment without having to include additional data synchronizers in the output that is generated from the modeling environment. Conventional approaches to modeling that use HLPLs supported by HLS do insert data synchronizers in the resulting output to bridge between clock domains.

Figure 8:
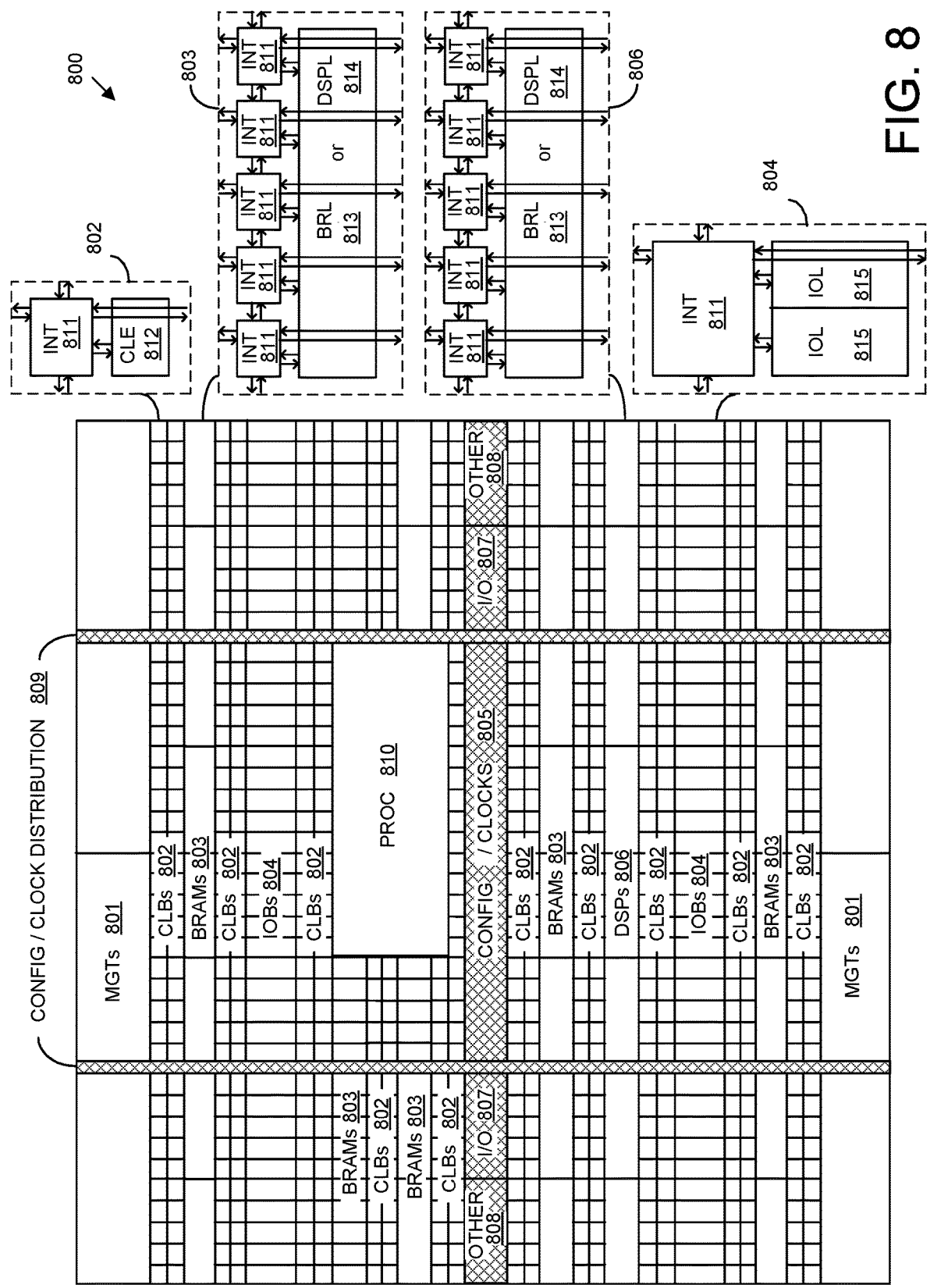
FIG. 8 illustrates an example architecture for an integrated circuit (IC).

FIG. 8 illustrates an example architecture 800 for an IC. A circuit design created using the techniques described within this disclosure may be further processed (e.g., through a design flow) and implemented within an IC using architecture 800 or another architecture similar thereto.

In one aspect, architecture 800 may be implemented within a programmable IC. For example, architecture 800 may be used to implement a field programmable gate array (FPGA). Architecture 800 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the top of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An IOB 804 may include, for example, two instances of an I/O logic element (IOL) 815 in addition to one instance of an INT 811. The actual I/O pads connected to IOL 815 may not be confined to the area of IOL 815.

In the example pictured in FIG. 8, a columnar area near the center of the die, e.g., formed of regions 805, 807, and 808, may be used for configuration, clock, and other control logic. Horizontal areas 809 extending from this column may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 8 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

A system as described herein in connection with FIG. 1, for example, is capable of further processing a circuit design generated as described herein for implementation within an IC having an architecture the same as or similar to that of FIG. 8. The system, for example, is capable of synthesizing, placing, and routing the circuit design. The system may also perform bitstream generation so that the bitstream may be loaded into the IC, thereby physically implementing the circuit design within the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "high level programming language" (HLPL) means a programming language, or set of instructions, used to program a data processing system where the instructions have a strong abstraction from the details of the data processing system, e.g., machine language. For example, an HLPL is capable of automating or hiding aspects of operation of the data processing system such as memory management. Examples of HLPLs include, but are not limited to, C, C++, and other suitable languages.

As defined herein, the term "hardware description language" or "HDL" is a computer-language that facilitates the documentation, design, and manufacturing of a digital system, such as an integrated circuit. An HDL is expressed in human readable form and combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high-level programming languages, an HDL also includes an explicit notion of time, e.g., clocks and/or clock signals, which is a primary attribute of a digital system. For example, an HDL design may describe the behavior of a circuit design as data transfers occur between registers each clock cycle. Examples of HDLs may include, but are not limited to, Verilog and VHDL. HDLs are sometimes referred to as register transfer level (RTL) descriptions of circuit designs and/or digital systems. Both Verilog and VHDL support the ability to specify attributes on modules in their native syntax.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method includes generating, using computer hardware, a data flow graph from a model that includes an HDL model block coupled to a non-HDL model block, wherein the HDL model block is derived from HDL code, dividing, using the computer hardware, the data flow graph into a first sub-graph corresponding to the HDL model block and a second sub-graph corresponding to the non-HDL model block, generating, using the computer hardware, a first HDL core from the first sub-graph, generating, using the computer hardware, synthesizable program code from the second sub-graph, performing, using the computer hardware, high-level synthesis on the synthesizable program code to generate a second HDL core, and generating, using the computer hardware, a circuit design including the first HDL core connected to the second HDL core.

In one aspect, generating the circuit design includes connecting the first HDL core to the second HDL core.

In another aspect, connecting the first HDL core to the second HDL core includes using external edges of nodes of the first sub-graph and the second sub-graph as port interfaces to connect the first HDL core to the second HDL core.

In another aspect, the method includes creating the HDL model block from the HDL code, wherein the HDL model block has a model interface derived from an HDL interface of the HDL code.

In another aspect, the method includes receiving a user-specified parameter for the HDL model block, wherein the generating the first HDL core includes parameterizing the first HDL core using the parameter.

In another aspect, performing high-level synthesis on the synthesizable program code includes implementing the second HDL core with an HDL interface that matches an HDL interface of the first HDL core.

In another aspect, the method includes including a hardware compiler directive within the synthesizable program code specifying the HDL interface of the second HDL core.

In another aspect, the hardware compiler directive is determined based on a user-specified parameter for the HDL model block.

In one or more embodiments, a system includes a memory configured to store program code and a processor coupled to the memory. The processor, in response to executing the program code, is configured to initiate operations. The operations include generating a data flow graph from a model that includes an HDL model block coupled to a non-HDL model block, wherein the HDL model block is derived from HDL code, dividing the data flow graph into a first sub-graph corresponding to the HDL model block and a second sub-graph corresponding to the non-HDL model block, generating a first HDL core from the first sub-graph, generating synthesizable program code from the second sub-graph, performing high-level synthesis on the synthesizable program code to generate a second HDL core, and generating a circuit design including the first HDL core connected to the second HDL core.

In one aspect, generating the circuit design includes connecting the first HDL core to the second HDL core.

In another aspect, connecting the first HDL core to the second HDL core includes using external edges of nodes of the first sub-graph and the second sub-graph as port interfaces to connect the first HDL core to the second HDL core.

In another aspect, the processor is configured to initiate operations further including creating the HDL model block from the HDL code, wherein the HDL model block has a model interface derived from an HDL interface of the HDL code.

In another aspect, the processor is configured to initiate operations further including receiving a user-specified parameter for the HDL model block, wherein the generating the first HDL core includes parameterizing the first HDL core using the parameter.

In another aspect, performing high-level synthesis on the synthesizable program code includes implementing the second HDL core with an HDL interface that matches an HDL interface of the first HDL core.

In another aspect, the processor is configured to initiate operations further including inserting (e.g., including) a hardware compiler directive within the synthesizable program code specifying the HDL interface of the second HDL core.

In another aspect, the hardware compiler directive is determined based on a user-specified parameter for the HDL model block.

In one or more embodiments, a computer program product includes a computer readable storage medium having program code stored thereon. The program code is executable by a processor to perform operations. The operations include generating a data flow graph from a model that includes an HDL model block coupled to a non-HDL model block, wherein the HDL model block is derived from HDL code, dividing the data flow graph into a first sub-graph corresponding to the HDL model block and a second sub-graph corresponding to the non-HDL model block, generating a first HDL core from the first sub-graph, generating synthesizable program code from the second sub-graph, performing high-level synthesis on the synthesizable program code to generate a second HDL core, and generating a circuit design including the first HDL core connected to the second HDL core.

In one aspect, the program code is executable by the computer hardware to initiate operations including receiving a user-specified parameter for the HDL model block, wherein the generating the first HDL core includes parameterizing the first HDL core using the parameter.

In another aspect, performing high-level synthesis on the synthesizable program code includes implementing the second HDL core with an HDL interface that matches an HDL interface of the first HDL core.

In another aspect, the program code is executable by the computer hardware to initiate operations including inserting (e.g., including) a hardware compiler directive within the synthesizable program code specifying the HDL interface of the second HDL core.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements.

Accordingly, reference should be made to the following claims, rather than to the foregoing disclosure, as indicating the scope of such features and implementations.

What is claimed is:

1. A method, comprising:
generating, using computer hardware, a data flow graph from a model that includes a hardware description language (HDL) model block coupled to a non-HDL model block, wherein the HDL model block is derived from HDL code;
dividing, using the computer hardware, the data flow graph into a first sub-graph corresponding to the HDL model block and a second sub-graph corresponding to the non-HDL model block;
generating, using the computer hardware, a first HDL core from the first sub-graph;
generating, using the computer hardware, synthesizable program code from the second sub-graph;
performing, using the computer hardware, high-level synthesis on the synthesizable program code to generate a second HDL core; and
generating, using the computer hardware, a circuit design including the first HDL core connected to the second HDL core.

2. The method of claim 1, wherein the generating the circuit design comprises:
connecting the first HDL core to the second HDL core.

3. The method of claim 2, wherein the connecting the first HDL core to the second HDL core comprises:
using external edges of nodes of the first sub-graph and the second sub-graph as port interfaces to connect the first HDL core to the second HDL core.

4. The method of claim 1, further comprising:
creating the HDL model block from the HDL code, wherein the HDL model block has a model interface derived from an HDL interface of the HDL code.

5. The method of claim 1, further comprising:
receiving a user-specified parameter for the HDL model block;
wherein the generating the first HDL core includes parameterizing the first HDL core using the parameter.

6. The method of claim 1, wherein the performing high-level synthesis on the synthesizable program code comprises:
implementing the second HDL core with an HDL interface that matches an HDL interface of the first HDL core.

7. The method of claim 6, further comprising:
including a hardware compiler directive within the synthesizable program code specifying the HDL interface of the second HDL core.

8. The method of claim 7, wherein the hardware compiler directive is determined based on a user-specified parameter for the HDL model block.

9. A system, comprising:
a memory configured to store program code; and
a processor coupled to the memory, wherein the processor, in response to executing the program code, is configured to initiate operations including:
generating a data flow graph from a model that includes a hardware description language (HDL) model block coupled to a non-HDL model block, wherein the HDL model block is derived from HDL code;
dividing the data flow graph into a first sub-graph corresponding to the HDL model block and a second sub-graph corresponding to the non-HDL model block;

generating a first HDL core from the first sub-graph;
generating synthesizable program code from the second sub-graph;
performing high-level synthesis on the synthesizable program code to generate a second HDL core; and
generating a circuit design including the first HDL core connected to the second HDL core.

10. The system of claim 9, wherein the generating the circuit design comprises:
connecting the first HDL core to the second HDL core.

11. The system of claim 10, wherein the connecting the first HDL core to the second HDL core comprises:
using external edges of nodes of the first sub-graph and the second sub-graph as port interfaces to connect the first HDL core to the second HDL core.

12. The system of claim 9, wherein the processor is configured to initiate operations further comprising:
creating the HDL model block from the HDL code, wherein the HDL model block has a model interface derived from an HDL interface of the HDL code.

13. The system of claim 9, wherein the processor is configured to initiate operations further comprising:
receiving a user-specified parameter for the HDL model block;
wherein the generating the first HDL core includes parameterizing the first HDL core using the parameter.

14. The system of claim 9, wherein the performing high-level synthesis on the synthesizable program code comprises:
implementing the second HDL core with an HDL interface that matches an HDL interface of the first HDL core.

15. The system of claim 14, wherein the processor is configured to initiate operations further comprising:
including a hardware compiler directive within the synthesizable program code specifying the HDL interface of the second HDL core.

16. The system of claim 15, wherein the hardware compiler directive is determined based on a user-specified parameter for the HDL model block.

17. A computer program product, comprising:
a computer readable storage medium having program code stored thereon, wherein the program code is executable by computer hardware to initiate operations including:
generating a data flow graph from a model that includes a hardware description language (HDL) model block coupled to a non-HDL model block, wherein the HDL model block is derived from HDL code;
dividing the data flow graph into a first sub-graph corresponding to the HDL model block and a second sub-graph corresponding to the non-HDL model block;
generating a first HDL core from the first sub-graph;
generating synthesizable program code from the second sub-graph;
performing high-level synthesis on the synthesizable program code to generate a second HDL core; and
generating a circuit design including the first HDL core connected to the second HDL core.

18. The computer program product of claim 17, wherein the program code is executable by the computer hardware to initiate operations including:
receiving a user-specified parameter for the HDL model block;
wherein the generating the first HDL core includes parameterizing the first HDL core using the parameter.

19. The computer program product of claim 17, wherein the performing high-level synthesis on the synthesizable program code comprises:
implementing the second HDL core with an HDL interface that matches an HDL interface of the first HDL core.

20. The computer program product of claim 19, wherein the program code is executable by the computer hardware to initiate operations including:
including a hardware compiler directive within the synthesizable program code specifying the HDL interface of the second HDL core.

* * * * *